(12) United States Patent
Dani et al.

(10) Patent No.: US 11,522,388 B2
(45) Date of Patent: Dec. 6, 2022

(54) WIRELESS CHARGING SYSTEM FOR CHARGING A CHARGEABLE ELECTRICAL ENERGY COURSE OF A HEATING DEVICE FOR AEROSOL-GENERATING ARTICLES

(71) Applicant: PHILIP MORRIS PRODUCTS S.A., Neuchatel (CH)

(72) Inventors: Bastian Dani, Miege (CH); Laurent Golay, Martigny (CH); Michel Bessant, Neuchatel (CH); Samer Abdo, Lonay (CH)

(73) Assignee: Philip Morris Products S.A., Neuchatel (CH)

( * ) Notice: Subject to any disclaimer, the term of this patent is extended or adjusted under 35 U.S.C. 154(b) by 781 days.

(21) Appl. No.: 16/327,907

(22) PCT Filed: Aug. 30, 2017

(86) PCT No.: PCT/EP2017/071687
§ 371 (c)(1),
(2) Date: Feb. 25, 2019

(87) PCT Pub. No.: WO2018/041850
PCT Pub. Date: Mar. 8, 2018

(65) Prior Publication Data
US 2019/0207422 A1 Jul. 4, 2019

(30) Foreign Application Priority Data
Aug. 31, 2016 (EP) ..................................... 16186470

(51) Int. Cl.
*H02J 50/10* (2016.01)
*A24F 40/40* (2020.01)
(Continued)

(52) U.S. Cl.
CPC .............. *H02J 50/10* (2016.02); *A24F 40/40* (2020.01); *A24F 40/90* (2020.01); *H02J 7/0045* (2013.01); *A24F 40/20* (2020.01)

(58) Field of Classification Search
CPC ....................................................... H02J 50/10
See application file for complete search history.

(56) References Cited

U.S. PATENT DOCUMENTS 9,018,899 B2   4/2015   Xiang
9,412,514 B2   8/2016   Komma
(Continued)

FOREIGN PATENT DOCUMENTS

CN    203859549    10/2014
EP    2668858      12/2013
(Continued)

OTHER PUBLICATIONS

Office Action issued in Japan for Application No. 2019-511927 dated Jul. 27, 2021 (5 pages). English translation included.
(Continued)

*Primary Examiner* — Drew A Dunn
*Assistant Examiner* — Tynese V McDaniel
(74) *Attorney, Agent, or Firm* — Mueting Raasch Group (57) ABSTRACT

A wireless charging system for charging a chargeable electrical energy source of a heating device for aerosol-generating articles comprises: —a charging device (3) comprising a planar flat transmitter coil (30), configured to supply an alternating current (I) to the planar flat transmitter coil (30); —a wirelessly chargeable electrical energy source (4) of a heating device (2) for aerosol-generating articles, comprising an electrical energy storage (41) and a tubular receiver coil (40) connected to the electrical energy storage (41), wherein the tubular receiver coil (40) has a longitudinal axis (42) and is adapted to be arranged in a charging position (Continued)

relative to the planar flat transmitter coil (30), wherein in the charging position the longitudinal axis (42) of the tubular receiver coil (40) extends in a plane parallel to the planar flat transmitter coil (30) and in radial direction relative to the planar flat transmitter coil (30), and wherein the tubular receiver coil (40) is arranged to overlap at least a portion of the planar flat transmitter coil (30).

13 Claims, 4 Drawing Sheets

(51) Int. Cl.
*A24F 40/90* (2020.01)
*H02J 7/00* (2006.01)
*A24F 40/20* (2020.01)

(56) References Cited

U.S. PATENT DOCUMENTS

| | | | |
|---|---|---|---|
| 10,004,259 B2 | 6/2018 | Sebastian | |
| 10,798,970 B2 | 10/2020 | Nakano | |
| 2011/0084652 A1* | 4/2011 | Julstrom | H02J 50/12 |
| | | | 320/108 |
| 2011/0086256 A1* | 4/2011 | Julstrom | H01M 10/425 |
| | | | 429/121 |
| 2012/0119698 A1* | 5/2012 | Karalis | H02J 50/10 |
| | | | 320/108 |
| 2014/0224267 A1* | 8/2014 | Levitz | A24F 40/40 |
| | | | 131/329 |
| 2015/0123486 A1* | 5/2015 | Abe | B60L 1/02 |
| | | | 307/104 |
| 2015/0237918 A1* | 8/2015 | Liu | H02J 7/0045 |
| | | | 429/163 |
| 2015/0332827 A1* | 11/2015 | Omori | H01F 27/346 |
| | | | 307/104 |
| 2015/0333561 A1 | 11/2015 | Alarcon | |
| 2017/0093216 A1* | 3/2017 | Cho | H02J 7/025 |
| 2020/0227950 A1* | 7/2020 | Lim | G06F 1/263 |
| 2021/0066963 A1* | 3/2021 | Wan | H01F 27/2823 |

FOREIGN PATENT DOCUMENTS

| | | | | |
|---|---|---|---|---|
| JP | H10-225021 | | 8/1998 | |
| JP | 2013-258897 | | 12/2013 | |
| JP | 2014-504142 | | 2/2014 | |
| JP | 2014-131417 | | 7/2014 | |
| JP | 2015-088673 | | 5/2015 | |
| JP | 2015-521847 | | 8/2015 | |
| RU | 2419945 | | 5/2011 | |
| RU | 2510558 | | 3/2014 | |
| WO | WO 2015/137815 | * | 9/2015 | ............... H02J 7/02 |
| WO | WO 2015/175715 | | 11/2015 | |
| WO | WO 2016/059073 | | 4/2016 | |
| WO | WO 2016-139813 | | 9/2016 | |

OTHER PUBLICATIONS

PCT Search Report and Written Opinion for PCTZEP2017/071687 dated Oct. 6, 2017 (13 pages).

Office Action issued in Russia for Application No. 2019109044 dated Oct. 26, 2020 (11 pages). English translation included.

* cited by examiner

WIRELESS CHARGING SYSTEM FOR CHARGING A CHARGEABLE ELECTRICAL ENERGY COURSE OF A HEATING DEVICE FOR AEROSOL-GENERATING ARTICLES

This application is a U.S. National Stage Application of International Application No. PCT/EP2017/071687 filed Aug. 30, 2017, which was published in English on Mar. 8, 2018, as International Publication No. WO 2018/041850 A1. International Application No. PCT/EP2017/071687 claims priority to European Application No. 16186470.7 filed Aug. 31, 2016.

The present invention relates to a wireless charging system for charging a chargeable electrical energy source of a heating device for aerosol-generating articles.

Previously known more conventional smoking articles, for example cigarettes, deliver flavor and aroma to the user as a result of a combustion process. A mass of combustible material, primarily tobacco, is combusted and an adjacent portion of material is pyrolized as the result of applied heat drawn therethrough, with typical combustion temperatures being in excess of 800° C. during puffing. During this heating, inefficient oxidation of the combustible material takes place and yields various distillation and pyrolysis products. As these products are drawn through the body of the smoking article towards the mouth of the user, they cool and condense to form an aerosol or vapor which gives the consumer the flavor and aroma associated with smoking.

An alternative to the more conventional smoking articles include those in which the combustible material itself does not directly provide the flavorants to the aerosol inhaled by the smoker. In these aerosol-generating articles, a combustible heating element, typically carbonaceous in nature, is combusted to heat air as it is drawn over the heating element and through a zone which contains heat-activated elements that release the flavored aerosol.

Yet another alternative to the more conventional smoking articles comprises an aerosol-forming tobacco-laden solid substrate. The aerosol-forming substrate is inserted into a cavity of the housing of a heating device and is heated to produce the aerosol and evolve the desired flavor.

Heating of the aerosol-forming substrate can be achieved in different ways. For example, in accordance with one embodiment, the—typically cylindrical—aerosol-forming substrate may comprise a slot in one end face thereof that extends axially into the body of the aerosol-forming substrate. The heating device comprises an electrical heater comprising a blade extending into the cavity, and upon insertion of the aerosol-forming substrate into the cavity the blade fits into the slot of the aerosol-forming substrate. The blade is subsequently electrically heated and the heat is transferred from the blade to the aerosol-forming substrate to form the aerosol.

In accordance with another embodiment, heating of the aerosol-forming substrate can be achieved through inductive heating of the aerosol-forming substrate. The aerosol-forming substrate may comprise a magnetically permeable and electrically conductive susceptor which is arranged in thermal proximity to the aerosol-forming tobacco-laden substrate. For example, the susceptor may be arranged in the aerosol-forming substrate in the form of particles, strips, etc. The susceptor of the tobacco-laden substrate is exposed to an alternating magnetic field generated by an induction source, so that an alternating magnetic field is induced in the susceptor. For example, the induction source may be a coil which can be arranged in the housing of the heating device in a manner so as to surround the cavity accommodating the aerosol-forming substrate. The susceptor is heated mainly through hysteresis losses and eddy currents, and the heat is transferred from the susceptor to the aerosol-forming substrate to form the aerosol.

Regardless of the mechanism of heating the aerosol-forming substrate, it is evident that electrical energy must be supplied from an electrical energy storage provided in the heating device (such as a chargeable or non-chargeable battery) to the blade or to the coil in order to effect heating of the aerosol-forming substrate. In case a chargeable battery is used, the heating device typically comprises a physical docking port for accommodating a physical connector of a charging device to charge (or recharge) the battery. The charging device can be connected to the mains. Upon being physically connected, the connector of the charging device and the docking port of the heating device are in conducting electrical contact with each other so that the chargeable battery can be charged. Either the charging device or the heating device or both comprise suitable electronics for controlling the charging process. Alternatively, it is generally conceivable to remove the chargeable battery from the heating device, charge the chargeable battery in a charging station separate from the heating device, and then reinsert the charged battery into the heating device. Charging of the chargeable battery in the charging station is generally performed in the same manner as described above (that is to say via a physical and electrically conductive contact).

The charging device and the heating device are typically specifically embodied for the intended charging of the battery. Or to say it in other words, in case the user needs to charge the battery the charging device must be available at the location where charging is to be performed. In addition, as has been discussed above a conducting electrical contact must be established between the charging device and the battery, such conducting electrical contact being prone to failure due to insufficient contact or due to electrical shorts or other detrimental influences on the conducting electrical contact.

Therefore, there is a need for a simple and reliable system for charging the chargeable energy source of a heating device for aerosol-generating articles.

In accordance with one aspect of the invention a wireless charging system for charging a chargeable electrical energy source of a heating device for aerosol-generating articles is suggested, the wireless charging system comprising:
a charging device comprising a planar flat transmitter coil, the charging device being configured to supply an alternating current to the planar flat transmitter coil to generate an alternating magnetic field;
a wirelessly chargeable electrical energy source of a heating device for aerosol-generating articles, the wirelessly chargeable electrical energy source comprising an electrical energy storage and a tubular receiver coil connected to the electrical energy storage,
wherein the tubular receiver coil has a longitudinal axis and is adapted to be arranged in a charging position relative to the planar flat transmitter coil, wherein in the charging position the longitudinal axis of the tubular receiver coil extends in a plane parallel to the planar flat transmitter coil as well as in radial direction relative to the planar flat transmitter coil,
and wherein in the charging position the tubular receiver coil is arranged to overlap with at least a portion of the planar flat transmitter coil to allow the tubular receiver coil to be penetrated by the alternating magnetic field.

A "planar flat coil" is a coil which is arranged in a flat (even, i.e. non-curved) plane. The windings of such planar flat coil are wound one around the other in the said flat plane about a center of the planar flat coil. The charging device comprising the planar flat transmitter coil may, for example, be a standard off-the-shelf charging device which may be embodied in accordance with a wireless charging standard such as for example "Qi" or "AirFuel". Such standard off-the-shelf charging devices comprise one or more planar flat transmitter coils and are readily available on the market. They are distributed at various locations around the world, and are provided, for example, in meeting rooms or meeting centers, hotels, etc., where they allow users to wirelessly charge the energy sources of electronic devices, such as for example smartphones, tablet computers, or other electronic devices which are adapted to be charged by such standard wireless charging devices.

To allow for such wireless charging, the electronic devices comprise a planar flat receiver coil often corresponding in size to the planar flat transmitter coil of the charging device. In the charging position, the planar flat receiver coil of the electronic device is arranged such that the center of the planar flat receiver coil and the center of the planar flat transmitter coil are aligned so that the planar flat receiver coil and the planar flat transmitter coil are congruently arranged. In addition, in the charging position the planar flat transmitter coil and the planar flat receiver coil are arranged at a small distance relative to each other, for example at a distance in the range of 5 mm (millimeters) to 40 mm.

Upon supplying an alternating current to the planar flat transmitter coil an alternating magnetic field is generated which penetrates the planar flat receiver coil, thereby inducing an alternating current in the planar flat receiver coil. The planar flat receiver coil is connected to an electrical energy storage (such as a chargeable battery) through suitable circuitry capable of converting the alternating current induced in the planar flat receiver coil into a direct current which is then used to charge the electrical energy storage. The charging process is controlled by a suitable control electronics which is arranged in the charging device, but additional control electronics may be arranged in the electronic device to be charged, too. Thus, a controlled wireless charging of the electronic device can be achieved.

Since the housing of a heating device for aerosol-generating articles typically has a tubular shape (for accommodating the typically cylindrical aerosol-forming substrate) it is practically impossible to arrange a planar flat receiver coil of an appropriate size in the housing of such heating device for aerosol-generating articles without rendering the size and shape of the heating device impractical.

In accordance with the wireless charging system according to the invention, therefore, the receiver coil is a tubular receiver coil (rather than a planar flat receiver coil) and has a longitudinal axis. A tubular receiver coil can well be arranged in the tubular housing of a heating device for aerosol-generating articles without rendering the size and shape of such heating device impractical.

When the tubular receiver coil is arranged in the charging position, the longitudinal axis of the tubular receiver coil extends both in a plane which is parallel to the planar flat transmitter coil as well as in a radial direction of the planar flat transmitter coil (of the charging device). The term "radial direction of the planar flat transmitter coil" denotes a direction from the center of the planar flat transmitter coil to the circumference of the planar flat transmitter coil. Or to say it in other words: The longitudinal axis of the tubular receiver coil is arranged in a plane which is parallel to the plane defined by the planar transmitter coil and which is spaced by a distance from the plane defined by the planar transmitter coil, while at the same time the longitudinal axis of the tubular receiver coil is arranged in the said plane parallel to the plane defined by the planar transmitter coil in the radial direction of the planar transmitter coil.

In addition, the tubular receiver coil is arranged to overlap with at least a portion of the planar flat transmitter coil. This overlap is necessary to allow the tubular receiver coil to in operation be effectively penetrated by the alternating magnetic field generated by an alternating current flowing through the planar flat transmitter coil. This alternating magnetic field penetrates the tubular receiver coil and induces an alternating current in the receiver coil.

The tubular receiver coil is connected to an electrical energy storage, for example chargeable battery that can be charged multiple times, through suitable well-known circuitry. To charge the battery, the alternating current induced in the receiver coil is converted to a DC current by the afore-mentioned well-known circuitry, and this DC current is then used to charge the battery.

The tubular receiver coil in one embodiment may comprise a single receiver coil portion only (a single continuous coil), while in other embodiments the receiver coil may comprise more than one receiver coil portion. A specific embodiment in which the tubular receiver coil comprises two receiver coil portions will be discussed further below.

Generally, it is conceivable that the wirelessly chargeable electrical energy source of the heating device for aerosol-generating articles is embodied as a unit that can be separated from (e.g. be taken out of) the heating device for the charging process, and that can be reinserted into the heating device once it has been charged.

However, it is preferred that the electrical energy source be arranged within the heating device for aerosol-generating articles in a manner that does not allow for separation of the energy source from the heating device. Charging of the energy source is then performed with the energy source being arranged within the heating device.

With the wireless charging system according to the invention it is possible to maintain the practical and convenient size and shape of the heating device for aerosol-generating articles while on the other hand the electrical energy storage of such heating device can be conveniently charged wirelessly, for example using standard off-the-shelf wireless charging devices which may be embodied in accordance with a wireless charging standard such as for example "Qi" or "AirFuel" and which are available at many locations. It is no longer necessary to physically connect the charging device and the heating device through a plug-and-connector connection in order to establish a conducting electrical contact for charging, nor is it necessary to carry on the respective charging equipment. Instead, charging of the battery can be conveniently performed wirelessly.

According to one aspect of the wireless charging system according to the invention, the tubular receiver coil comprises a first receiver coil portion and a second receiver coil portion which are spaced from one another in the direction of the longitudinal axis of the receiver coil by a predetermined distance. The first receiver coil portion has a first winding direction and the second receiver coil portion has a second winding direction opposite to the first winding direction. The predetermined distance by which the first receiver coil portion and the second receiver coil portion are spaced from one another is such that in the charging position the first receiver coil portion overlaps with a first transmitter coil portion in the radial direction while the second receiver coil portion overlaps with a second transmitter coil portion in the radial direction. The first transmitter coil portion and the second transmitter coil portion are oppositely arranged relative to a center of the planar flat transmitter coil.

For the sake of simplicity and by way of example only, let us assume that the shape of the planar flat transmitter coil is a square (with rounded corners), that is to say the planar flat transmitter coil comprises two pairs of oppositely arranged straight transmitter coil portions (the respective opposite sides of the square). Let us further glance at one of these pairs of oppositely arranged transmitter coil portions. One transmitter coil portion of such pair is the afore-mentioned first transmitter coil portion while the corresponding oppositely arranged transmitter coil portion is the second transmitter coil portion. Obviously, an alternating current flowing through the first transmitter coil portion in a first direction flows through the corresponding second transmitter coil portion in a second direction which is opposite to the first direction. As a consequence the directions of the alternating magnetic field generated by the alternating current flowing through the first transmitter coil portion is opposite to the direction of the alternating magnetic field generated by the same alternating current flowing through the second transmitter coil portion.

The tubular receiver coil may be cylindrical (e.g. circular cross-section) and comprises two cylindrical receiver coil portions having the same number of windings, a first receiver coil portion and a second receiver coil portion. The first receiver coil portion is arranged to overlap with the first transmitter coil portion and the second receiver coil portion is arranged to overlap with the (oppositely arranged) second transmitter coil portion. As the first and second receiver coil portions together form the receiver coil the output end of the first receiver coil portion is connected with the input end of the second receiver coil portion. Let us further assume that the first and second receiver coil portions both fully overlap the first and second transmitter coil portions in radial direction. The magnetic field penetrating through the first receiver coil portion and the magnetic field penetrating through the second receiver coil portion have the same strengths, however, they are oppositely directed. As a consequence, the alternating current induced in the first receiver coil portion and the alternating current induced in the second receiver coil portion have the same amperage, however, they are oppositely directed so that the total amperage induced in the first and second receiver coil portions destructively add to zero.

However, since according to this aspect of the charging system of the invention the winding direction of the second receiver coil portion is opposite to that of the first receiver coil portion the alternating current induced in the first receiver coil portion and the alternating current induced in the second receiver coil portion constructively add. In addition, the magnetic flux of the alternating magnetic field of the two transmitter coil portions (the first and second transmitter coil portions) and, accordingly, the sum of the alternating currents induced in the first and second receiver coil portions is used to charge the battery. And while generally a receiver coil comprising only one single receiver coil portion is operable, too (in such case the single receiver coil portion overlaps only one transmitter coil portion), the afore-discussed embodiment with the two receiver coil portions further increases the efficiency of the wireless charging system according to the invention.

According to a further aspect of the wireless charging system according to the invention, the tubular receiver coil is wound around a tubular sleeve which is made of at least one layer of a magnetically conductive and electrically non-conductive sheet material, and wherein the electrical energy storage is arranged in the interior of the tubular sleeve.

This aspect is advantageous in that the tubular sleeve shields the electrical energy storage (and any circuitry related thereto) which is arranged in the interior of the tubular sleeve from the magnetic flux generated by the transmitter coil. Accordingly, the electrical energy storage (e.g. the battery) and the circuitry are shielded from any negative influence such magnetic flux may have on the electrical energy storage and the related circuitry. A sheet material is advantageous in that the sleeve can be easily manufactured through wrapping a number of layers of the sheet material one around the other. And while the electrical energy storage and the related circuitry are shielded from the magnetic flux, the magnetic flux at the same time enters the tubular magnetically conductive sleeve and penetrates through the receiver coil which is wound around the tubular sleeve so as to induce an alternating current in the receiver coil.

In accordance with a further aspect of the wireless charging system according to the invention the magnetically conductive and electrically non-conductive sheet material is ferrite. Ferrite is an advantageous material having the aforementioned properties, and for example a number of three such layers of ferrite sheet material can be used to form the sleeve, although this number is mentioned by way of example only and is by no way intended to be limiting.

Yet a further aspect of the wireless charging system according to the invention relates to the embodiment comprising the first and second receiver coil portions which are arranged to overlap the first and second oppositely arranged transmitter coil portions, respectively, with these first and second receiver coil portions having first and second winding directions (see discussion above). According to this aspect, the tubular sleeve comprises three separate individual tubular sleeve portions, a first tubular sleeve end portion, a second tubular sleeve end portion, and an intermediate tubular sleeve portion arranged between the first and second tubular sleeve end portions. The first tubular sleeve end portion, the intermediate tubular sleeve portion and the second tubular sleeve end portion are arranged along a tubular sleeve longitudinal axis. The first tubular sleeve end portion and the intermediate tubular sleeve portion as well as the intermediate tubular sleeve portion and the second tubular sleeve end portion are spaced from one another by an annular gap of a predetermined width small enough to prevent magnetic flux from entering the interior of the tubular sleeve. The first receiver coil portion having the first winding direction is wound around the first tubular sleeve end portion while the second receiver coil portion having the second winding direction opposite to the first winding direction is wound around the second tubular sleeve end portion.

The separation of the tubular sleeve into three separate individual tubular sleeve portions prevents that any flux generated in the first sleeve end portion may overlap with an oppositely directed magnetic flux generated in the second sleeve end portion, or vice versa, as this would reduce the overall efficiency. The predetermined width of the annular gap is determined such that the following two conditions are met. On one hand, the magnetic resistance of the annular (air) gap arranged between the first tubular sleeve end portion and the intermediate tubular sleeve portion, as well as the magnetic resistance of the annular (air) gap between the intermediate tubular sleeve portion and the second tubular sleeve end portion must be very significantly higher than that of the magnetically conductive sheet material (which has a low magnetic resistance), so that magnetic flux of any individual tubular sleeve portion does not couple into an adjacently arranged separate individual tubular sleeve portion due to the magnetic resistance of the annular (air) gap. Thus, the individual tubular sleeve portions are essentially separated from each other as regards magnetic flux (thus avoiding unwanted interference of magnetic flux). On the other hand, the predetermined width of the gap is small enough to not allow the alternating magnetic field generated by the transmitter coil to enter the interior of the tubular sleeve (comprising the three separate individual tubular sleeve portions) in order to shield the electrical energy storage and related circuitry from any negative influence such magnetic field may have on the electrical energy storage and the related circuitry.

Summing up, in practice the three separate individual tubular sleeve portions prevent the magnetic field generated by the transmitter coil from entering the interior of the tubular sleeve where the battery and related circuitry is arranged, while at the same time they prevent the adverse effects of magnetic flux interference from occurring.

In accordance with still a further aspect of the wireless charging system according to the invention, each of the first tubular sleeve end portion and the second tubular sleeve end portion comprises two circumferential rings arranged at the ends of the respective first and second tubular sleeve end portion and a recessed portion arranged between the two circumferential rings. The first receiver coil portion is arranged in the recessed portion of the first tubular sleeve end portion while the second receiver coil portion is arranged in the recessed portion of the second tubular sleeve end portion.

This aspect is advantageous in that the first receiver coil portion and the second receiver coil portion (having the opposite winding direction) are arranged and positioned in the recessed portion of the first and second tubular sleeve end portion, respectively, while being retained in this position on the first and second tubular sleeve end portion by the respective first and second circumferential rings. Also, it is advantageous in that the positions of the first and second receiver coil portions relative to each other (and thus the distance they are arranged relative to each other) are securely maintained.

According to a further aspect of the wireless charging system according to the invention, the length of the first tubular sleeve end portion is equal to or smaller than the width of the first transmitter coil portion, and the length of the second tubular sleeve end portion is equal to or smaller than the width of the second transmitter coil portion.

This aspect is advantageous with respect to the arrangement of the first and second receiver coil portions relative to the first and second transmitter coil portions. For the sake of better understanding let us again assume, by way of example, that the planar flat transmitter coil has the shape of a square (with rounded edges). Each side of the square of the planar flat transmitter coil is formed by a number of windings which are arranged in parallel, and opposite sides of the square are also arranged parallel to each other. Accordingly, each side of the square has a width that depends on the actual number of windings, and since typically oppositely arranged sides of the square have the same number of windings such oppositely arranged sides of the square have the same widths. As has been discussed already, the first and second tubular receiver coil portions (having opposite winding directions) must overlap the first and second transmitter coil portions, respectively, to allow for the magnetic flux of the alternating magnetic field generated by the first and second transmitter coil portions to penetrate through the first and second tubular receiver coil portions in order to induce an alternating current in the first and second receiver coil portions (which can be converted by suitable circuitry into a direct current for charging the electrical energy storage, as is discussed above already). It is evident, that it is particularly efficient to have as much as possible of the magnetic flux penetrate through the respective first and second tubular receiver coil portions.

Let us further assume that the dimensions of the square transmitter coil are known (as they may be compliant with a wireless charging standard such as "Qi" or "AirFuel", as also discussed above already). In particular, the distance between halfway the width of one side of the square (which is half the distance between the outermost winding and the innermost winding) and halfway the width of the opposite side of the square is known. The longitudinal axis of the tubular receiver coil, which corresponds to the coinciding longitudinal axes of the first and second tubular receiver coil portions, and also the longitudinal axes of the first and second tubular sleeve end portions, extend in the direction of the widths of the oppositely arranged sides of the square and in a plane parallel to the planar flat transmitter coil (as is again already discussed above).

In case the width of the first tubular sleeve end portion is equal to the width of the first transmitter coil portion (in the afore-described embodiment to the width of one side of the square) and the width of the second tubular sleeve end portion is equal to the width of the second transmitter coil portion (in the afore-described embodiment to the width of the opposite side of the square), then the first and second receiver coil portions should be accurately arranged relative to the first and second portions of the transmitter coil in order to have the maximum possible magnetic flux generated by the first and second transmitter coil portions enter the first and second tubular sleeve end portions and penetrate through the first and second receiver coil portions.

In case the width of the first tubular sleeve end portion is smaller than the width of the first transmitter coil portion (in the afore-described embodiment smaller than the width of one side of the square) and the width of the second tubular sleeve end portion is also smaller than the width of the second transmitter coil portion (in the afore-described embodiment smaller than the width of the opposite side of the square), then the first and second receiver coil portions are more tolerant regarding an accurate arrangement relative to the first and second portions of the transmitter coil while still allowing the maximum possible magnetic flux to enter the first and second tubular sleeve end portions. For example, the first tubular sleeve end portion may be arranged somewhat decentered towards the outermost end of the first transmitter coil portion (i.e. towards the outermost end of one side of the square) and at the same time the second tubular sleeve end portion may be arranged somewhat decentered towards the innermost end of the second transmitter coil portion (i.e. towards the innermost end of the opposite side of the square). However, since the length of each of the first and second tubular end sleeves is smaller than the width of the corresponding first and second transmitter coil portion the full length of the respective tubular sleeve end portions still extends within the width of the respective side of the square. Accordingly, the maximum possible magnetic flux is still possible to enter the first and second tubular sleeve end portions and to penetrate through the respective first and second receiver coil portion.

According to yet a further aspect of the wireless charging system according to the invention, the wireless charging system comprises a heating device for aerosol-generating articles including a tubular housing in which a heater for heating an aerosol-forming substrate as well as the wirelessly chargeable electrical energy source comprising the tubular receiver coil are arranged. The wirelessly chargeable energy source is arranged in a waterproof portion of the tubular housing of the heating device.

This aspect is advantageous in that on one hand the wirelessly chargeable electrical energy source is arranged in the tubular housing of the heating device for aerosol-generating articles, so that for the wireless charging of the electrical energy source it is only required to arrange the heating device relative to the charging device such that the wirelessly chargeable electrical energy source is arranged in the charging position. No separation of the wirelessly chargeable electrical energy source from the heating device is necessary. In addition, the arrangement of the wirelessly chargeable electrical energy source in a waterproof portion of the tubular housing of the heating device is advantageous since the wirelessly chargeable electrical energy source cannot get damaged even if the heating device is exposed to water, as this may occur during cleaning of the heating device (for example during cleaning of the cavity for accommodating the aerosol-forming substrate).

Another general aspect of the invention relates to a method for the wireless charging of a chargeable electrical energy source of a heating device for aerosol-generating articles. The method comprises providing a charging device comprising a planar flat transmitter coil, the charging device being configured to supply an alternating current to the planar flat transmitter coil to generate an alternating magnetic field;

providing a wirelessly chargeable electrical energy source of a heating device for aerosol-generating articles, the wirelessly chargeable electrical energy source comprising an electrical energy storage and a tubular receiver coil connected to the electrical energy storage, wherein the tubular receiver coil has a longitudinal axis, arranging the wirelessly chargeable electrical energy source in a charging position relative to the planar flat transmitter coil, wherein in the charging position the longitudinal axis of the tubular receiver coil extends in a plane parallel to the planar flat transmitter coil and in a radial direction of the planar flat transmitter coil, and wherein further in the charging position the tubular receiver coil is arranged to overlap with at least a portion of the planar flat transmitter coil to allow the tubular receiver coil to be penetrated by the alternating magnetic field, supplying an alternating current to the planar flat transmitter coil, thereby generating an alternating magnetic field penetrating through the tubular receiver coil and inducing an alternating charging current in the tubular receiver coil, and charging the chargeable energy source using the alternating charging current induced in the tubular receiver coil.

The advantages of this method are the same as those already discussed above for the wireless charging system according to the invention. Therefore, they are not reiterated here.

According to one aspect of the method according to the invention, the step of providing a wirelessly chargeable electrical energy source comprises providing an electrical energy source having a tubular receiver coil that comprises a first receiver coil portion and a second receiver coil portion which are spaced from one another in the direction of the longitudinal axis of the receiver coil by a predetermined distance. The first receiver coil portion has a first winding direction and the second receiver coil portion has a second winding direction opposite to the first winding direction. The step of arranging the tubular receiver coil in the charging position comprises arranging the first receiver coil portion to overlap with a first transmitter coil portion in the radial direction, and arranging the second receiver coil portion to overlap a with a second transmitter coil portion in the radial direction, with the first transmitter coil portion and the second transmitter coil portion being oppositely arranged relative to a center of the planar flat transmitter coil.

According to a further aspect of the method according to the invention, the step of providing a wirelessly chargeable electrical energy source comprises providing a wirelessly chargeable electrical energy source in which the receiver coil is wound around a tubular sleeve made of at least one layer of a magnetically conductive and electrically non-conductive sheet material, with the chargeable electrical energy source being arranged in the interior of the tubular sleeve.

In accordance with still a further aspect of the method according to the invention, the step of providing a wirelessly chargeable electrical energy source further comprises providing a wirelessly chargeable electrical energy source in which the tubular sleeve comprises three separate individual tubular sleeve portions, a first tubular sleeve end portion, a second tubular sleeve end portion, and an intermediate tubular sleeve portion arranged between the first and second tubular sleeve end portions. The first tubular sleeve end portion, the intermediate tubular sleeve portion and the second tubular sleeve end portion are arranged along a tubular sleeve longitudinal axis. The first tubular sleeve end portion and the intermediate tubular sleeve portion as well as the intermediate tubular sleeve portion and the second tubular sleeve end portion are spaced from one another by an annular gap of a predetermined width to prevent magnetic flux from entering the interior of the tubular sleeve. The first receiver coil portion having the first winding direction is wound around the first tubular sleeve end portion while the second receiver coil portion having the second winding direction opposite to the first winding direction is wound around the second tubular sleeve end portion.

In accordance with yet another aspect of the method according to the invention, the step of providing a wirelessly chargeable electrical energy source comprises providing a wirelessly chargeable electrical energy source in which each of the first tubular sleeve end portion and the second tubular sleeve end portion comprises two circumferential rings arranged at the ends of the respective first and second tubular sleeve end portion and a recessed portion arranged between the two circumferential rings. The first receiver coil portion is arranged in the recessed portion of the first tubular sleeve end portion while the second receiver coil portion is arranged in the recessed portion of the second tubular sleeve end portion.

The advantages of the various embodiments of the method according to the invention correspond to the advantages of the respective embodiment of the wireless charging system according to the invention and, therefore, they are not reiterated.

Another general aspect of the invention relates to a wirelessly chargeable heating device for aerosol-generating articles, comprising:
- a tubular housing comprising a cavity for accommodating an aerosol-forming substrate,
- a heater arranged in the tubular housing, the heater being configured to heat an aerosol-forming substrate to be accommodated in the cavity,
- a wirelessly chargeable electrical energy source for supplying electrical energy to the heater, wherein the wirelessly chargeable electrical energy source is arranged in the tubular housing and comprises an electrical energy storage and a tubular receiver coil connected to the electrical energy storage, the tubular receiver coil having a longitudinal axis and being configured to be arranged in a charging position relative to a planar flat transmitter coil of a charging device such that in the charging position the longitudinal axis of the tubular receiver coil extends in a plane parallel to the planar flat transmitter coil in radial direction relative to the planar flat transmitter coil and that the tubular receiver coil overlaps with at least a portion of the planar flat transmitter coil.

Such wirelessly chargeable heating device for aerosol-generating articles is advantageous over prior art heating devices for aerosol-generating articles for the reasons already discussed in detail above for the wireless charging system of the invention. Therefore, these advantages are not reiterated.

According to one aspect of the wirelessly chargeable heating device according to the invention, the tubular housing comprises a waterproof portion in which the wirelessly chargeable electrical energy source is arranged.

In accordance with a further aspect of the wirelessly chargeable heating device according to the invention, the tubular receiver coil comprises a first receiver coil portion and a second receiver coil portion which are spaced from one another in the direction of the longitudinal axis of the receiver coil by a predetermined distance. The first receiver coil portion has a first winding direction and the second receiver coil portion has a second winding direction opposite to the first winding direction.

According to still a further aspect of the wirelessly chargeable heating device according to the invention, the tubular receiver coil is wound around a tubular sleeve and is made of at least one layer of a magnetically conductive and electrically non-conductive sheet material. The chargeable electrical energy source is arranged in the interior of the tubular sleeve.

According to yet a further aspect of the wirelessly chargeable heating device according to the invention, the magnetically conductive and electrically non-conductive sheet material is ferrite.

In accordance with still a further aspect of the wirelessly chargeable heating device according to the invention, the tubular sleeve comprises three separate individual tubular sleeve portions, a first tubular sleeve end portion, a second tubular sleeve end portion, and an intermediate tubular sleeve portion arranged between the first and second tubular sleeve end portions. The first tubular sleeve end portion, the intermediate tubular sleeve portion and the second tubular sleeve end portion are arranged along a tubular sleeve longitudinal axis. The first tubular sleeve end portion and the intermediate tubular sleeve portion as well as the intermediate tubular sleeve portion and the second tubular sleeve end portion are spaced from one another by an annular gap of a predetermined width to prevent magnetic flux from entering the interior of the tubular sleeve. Furthermore, the first receiver coil portion having the first winding direction is wound around the first tubular sleeve end portion while the second receiver coil portion having the second winding direction opposite to the first winding direction is wound around the second tubular sleeve end portion.

In accordance with yet a further aspect of the wirelessly chargeable heating device according to the invention, each of the first tubular sleeve end portion and the second tubular sleeve end portion comprises two circumferential rings arranged at the ends of the respective first and second tubular sleeve end portion and a recessed portion arranged between the two circumferential rings. The first receiver coil portion is arranged in the recessed portion of the first tubular sleeve end portion while the second receiver coil portion is arranged in the recessed portion of the second tubular sleeve end portion.

Further advantageous aspects and embodiments become evident from the following description of embodiments of the invention with the aid of the drawings in which.

Figure 1:
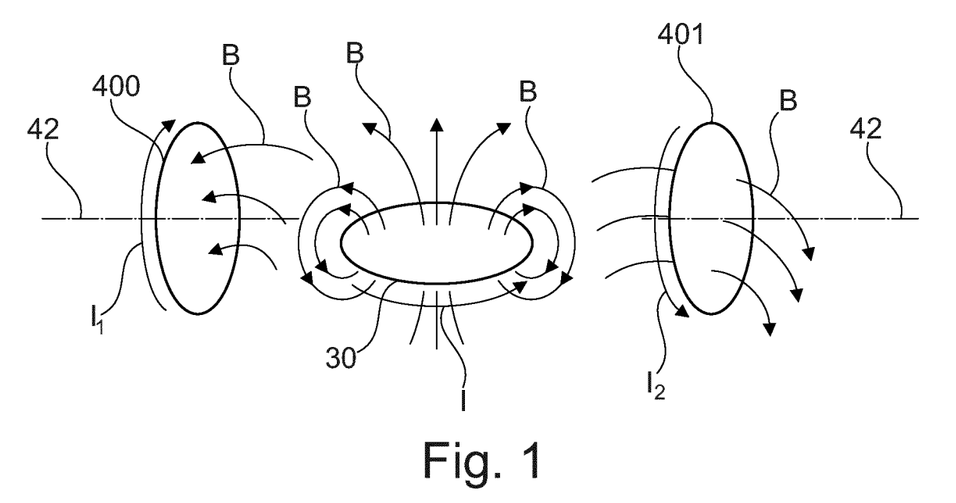
FIG. 1 shows a schematic representation of the field lines of the magnetic flux density generated by a planar flat transmitter coil penetrating through two receiver coil portions (only one winding being shown of the transmitter coil and of each of the receiver coil portions)

In FIG. 1 a schematic representation of the field lines of the magnetic flux (represented by the magnetic flux density B) generated by an alternating current I flowing through a planar flat transmitter coil 30 is shown. Two tubular receiver coil portions, a first receiver coil portion 400 and a second receiver coil portion 401, are also shown in FIG. 1, with only one winding of the transmitter coil 30 and of each of the first and second tubular receiver coil portions 400, 401 being shown for the sake of simplicity. As can be seen, the common longitudinal axis 42 of the tubular receiver coil comprising the first and second receiver coil portions 400, 401 extends in a plane parallel to the planar flat transmitter coil 30. Or to say it in other words, the winding(s) of the first and second receiver coil portions 400, 401 extend in a plane perpendicular to the planar flat transmitter coil 30. Taking into account that the—in the "exploded view" of FIG. 1—somewhat spaced first and second receiver coil portions 400, 401 are arranged above respective portions of the transmitter coil 30, as will be explained in more detail below, the magnetic flux (represented by the field lines of the magnetic flux density B) penetrates through the first and second receiver coil portions 400, 401 essentially as shown schematically in FIG. 1.

Since the magnetic flux (represented by the field lines of the magnetic flux density B) is an alternating magnetic flux (it is generated by the alternating current I flowing through transmitter coil 30) an alternating current $I_1$ is induced in the first receiver coil portion 400 while an alternating current $I_2$ is induced in the second receiver coil portion 401. Due to the magnetic flux (represented by the magnetic flux density B) penetrating through the receiver coil portions 400, 401 in opposite directions, the alternating current $I_1$ induced in the first receiver coil portion 400 has a direction opposite to the direction of the alternating current $I_2$ induced in the second receiver coil portion 401, assuming that the winding directions of the first and second receiver coil portions 400,401 are the same, so that the induced alternating currents $I_1$ and $I_2$ would destructively add (due to their opposite directions).

Figure 2:
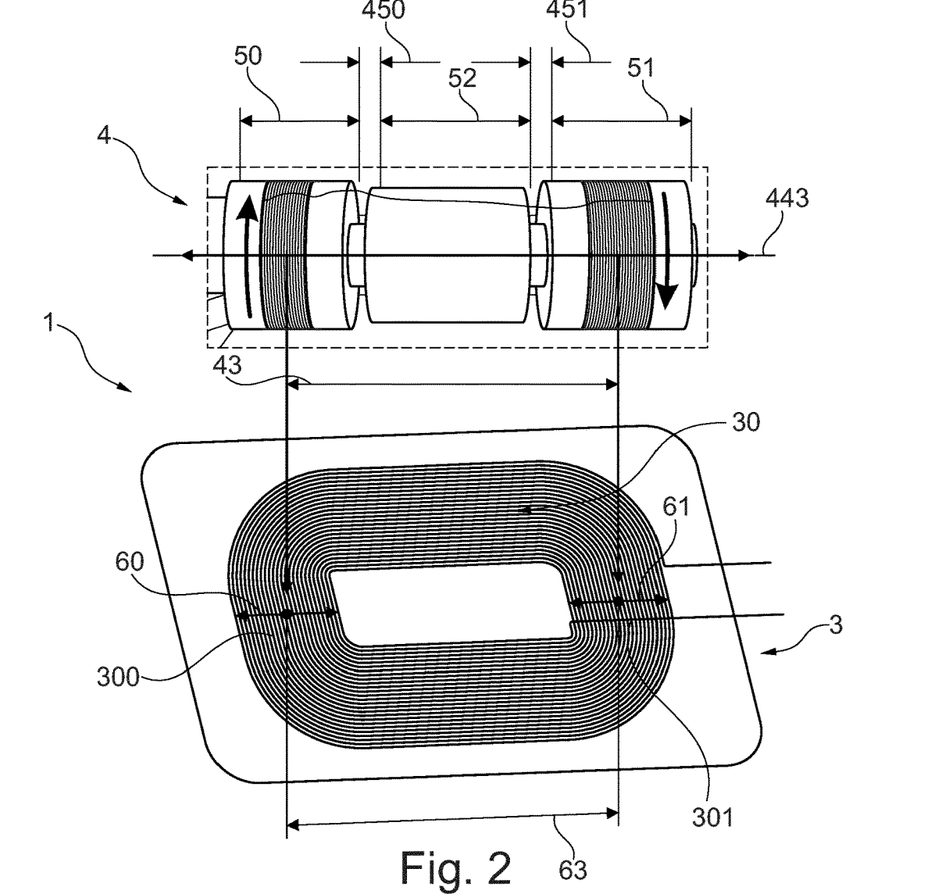
FIG. 2 shows a first embodiment of essential components of a wireless charging system according to the invention, comprising a wirelessly chargeable electrical energy source having two receiver coil portions with opposite winding directions, and a charging device with a transmitter coil having the shape of a square.
Figure 3:
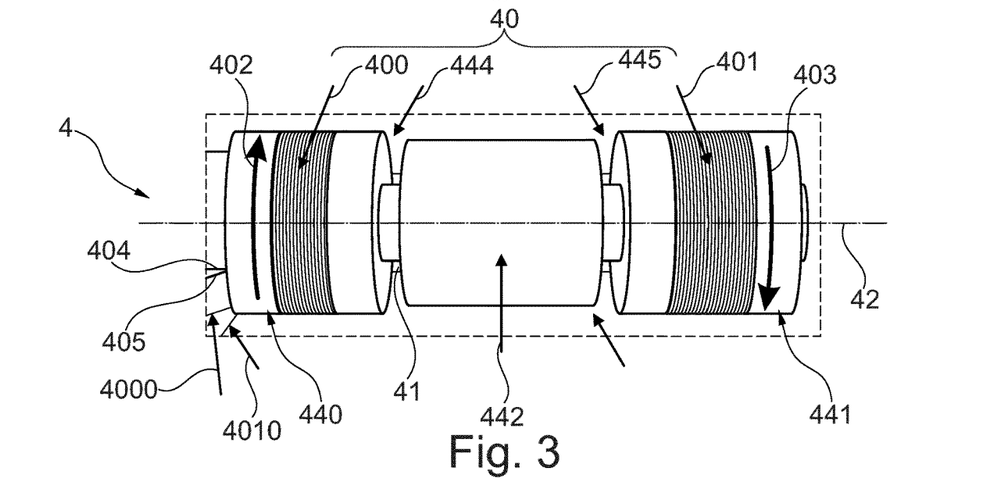
FIG. 3 shows the wirelessly chargeable energy source of FIG. 2 in an enlarged view.

FIG. 2 shows a first embodiment of essential components of a wireless charging system according to the invention, comprising a charging device 3 having a planar flat transmitter coil 30 with a square shape, and a wirelessly chargeable energy source 4. FIG. 3 shows the wirelessly chargeable energy source 4 of FIG. 2 in an enlarged view. Wirelessly chargeable energy source 4 comprises a receiver coil 40 comprising the afore-mentioned first and second receiver coil portions 400, 401. As can be seen from FIG. 2, first receiver coil portion 400 is arranged above a first transmitter coil portion 300 of transmitter coil 30 while second receiver coil portion 401 is arranged above a second transmitter coil portion 301 of transmitter coil 30. However, contrary to what is shown in FIG. 1, the first and second receiver coil portions 400, 401 have opposite winding directions 402, 403, so that it is evident that any magnetic flux penetrating through these first and second receiver coil portions 400, 401 induces alternating currents in the first and second receiver coil portions 400, 401 which constructively add, taking the above-explained principles of FIG. 1 into account.

Wirelessly chargeable energy source 4 further comprises an electrical energy storage 41 (see also FIG. 4) which may, for example, be embodied as a rechargeable battery. The two connection wires 404, 405 (see also FIG. 4) of receiver coil 40 are connected through well-known circuitry (e.g. including a rectifier circuit) to the rechargeable battery to charge the battery with a DC current.

Wirelessly chargeable energy source 4 further comprises a tubular sleeve comprising three separate individual tubular sleeve portions made of ferrite sheet material, namely a first tubular sleeve end portion 440, a second tubular sleeve end portion 441, and an intermediate tubular sleeve portion 442, which are arranged along a common tubular sleeve longitudinal axis 443. Intermediate tubular sleeve portion 442 is arranged between the first and second tubular sleeve end portions 440, 441. The first tubular sleeve end portion 440, the second tubular sleeve end portion 441 and the intermediate tubular sleeve portion 442 together form a quasi-continuous tubular sleeve, with the electrical energy storage 41 including the battery and the well-known electronic circuitry being arranged in the interior of that quasi-continuous tubular sleeve. Actually, the tubular sleeve is not completely continuous since there are annular gaps 444, 445 (typically air gaps) arranged between the separate individual tubular sleeve portions 440, 441, 442, so that the separate individual tubular sleeve portions 440, 441, 442 are spaced from one another by the annular gaps 444, 445.

Generally, the annular gaps 444, 445 have a width 450, 451 which is small enough to prevent magnetic flux from entering the interior of the tubular sleeve formed by the three tubular sleeve portions 440, 441, 442, where the battery and the well-known electronic circuitry is arranged. Accordingly, the tubular sleeve portions 440, 441, 442 (acting as magnetic flux concentrators) protect the battery and the circuitry from being adversely affected by magnetic flux entering the interior of the tubular sleeve while at the same time the separation of the tubular sleeve portions 440, 441, 442 by the annular air gaps 444, 445 prevents the occurrence of interference of magnetic flux in the first and second tubular sleeve end portions 440, 441 (i.e. any magnetic flux entering the first tubular sleeve end portion 440 is practically prevented from interfering with magnetic flux entering the second tubular sleeve end portion 441, and vice versa, or at least such interference is substantially reduced; the annular gaps 444, 445 constitute a high magnetic resistance when compared with the magnetic resistance of the respective tubular sleeve portions 440, 441, 442).

Each of the first and second tubular sleeve end portions 440, 441 further comprises two circumferential rings 446, 447 (see FIG. 6) which are arranged at the ends of the first and second tubular sleeve end portions 440, 441, respectively. The first receiver coil portion 400 is arranged in a recessed portion 448 of the first tubular sleeve end portion 440 which is formed between the two circumferential rings 446, and the second receiver coil portion 401 (with the opposite winding direction) is arranged in a recessed portion 449 of the second tubular sleeve end portion 441 which is formed between the two circumferential rings 447.

The above-described wirelessly chargeable energy source 4 may, for example, be manufactured in the manner described in the following with the aid of FIG. 4, FIG. 5 and FIG. 6.

Figure 4:
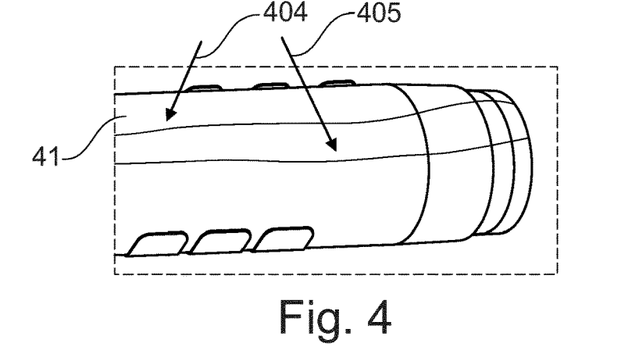
FIG. 4 shows the electrical energy storage of the wirelessly chargeable energy source of FIG. 2.

In FIG. 4 the electrical energy storage 41 including the well-known electronic circuitry (including, for example, a rectifier circuit for converting an AC current to a DC current) is shown together with the connection wires 404, 405 (see also FIG. 3).

Figure 5:
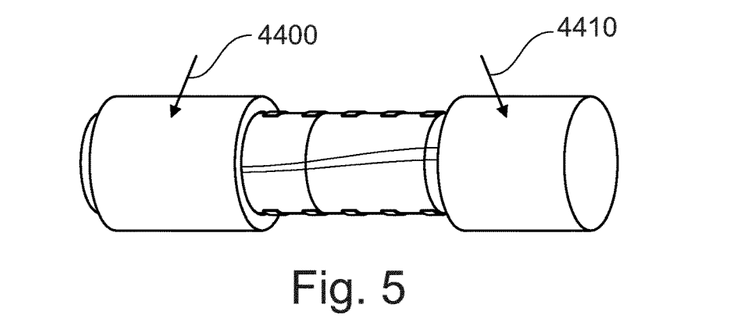
FIG. 5 shows the electrical energy storage of FIG. 4 with first and second tubular sleeve end portions of ferrite sheet material wrapped around the respective opposite ends of the electrical energy storage of FIG. 2.

As can be seen best in FIG. 5, cylindrical portions 4400, 4410 are then created by wrapping a number of layers of a ferrite sheet material, for example three layers, respectively, around the respective ends of the electrical energy storage 41.

Figure 6:
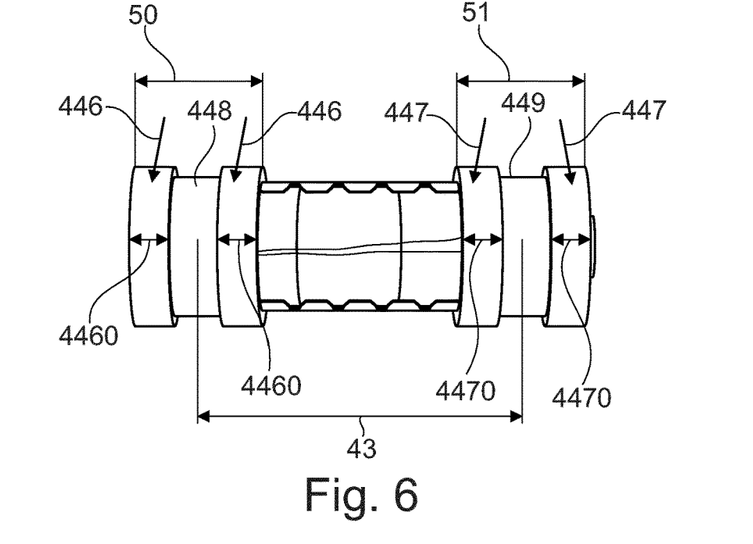
FIG. 6 shows the electrical energy storage of FIG. 5 with the two tubular sleeve end portions of ferrite sheet material, but in addition with two circumferential rings of ferrite sheet material arranged at both ends of each of the tubular sleeve end portions.

Thereafter, as can be seen best in FIG. 6, the circumferential rings 446, 447 are created by wrapping a number of layers, e.g. another three layers, of the ferrite sheet material having a width 4460, 4470 around the cylindrical portions 4400, 4410, so that the first tubular sleeve end portion 440 comprising the circumferential rings 446 and the recess 448 arranged between these rings 446 as well as the second tubular sleeve end portion 441 comprising the circumferential rings 447 and the recess 449 arranged between these rings 447 are formed.

In the next step (not shown) the intermediate tubular sleeve portion 442 is created by wrapping a number of ferrite sheet material around the electrical energy storage 41, so that after having completed this wrapping step the tubular sleeve comprising the three separate individual tubular sleeve portions 440, 441, 442 separated by the annular gaps 444, 445 is complete. The receiver coil 40 comprising the first and second receiver coil portions 400, 401 is then manufactured by first wrapping the windings of the first receiver coil portion 400 in the recess 448 around the cylindrical portion 4400 of the first tubular sleeve end portion 440, then changing the wrapping direction, and wrapping the windings of the second receiver coil portion 401 in the opposite direction in the recess 449 around the cylindrical portion 4410 of the second tubular sleeve end portion 441. Thus, the receiver coil 40 is a series connection of the first and second receiver coil portions 400, 401, however, the first and second receiver coil portions having opposite winding directions. The two ends 4000 and 4010 of the receiver coil 40 (see FIG. 3) are then connected to the connection wires 404, 405 leading to the electrical energy storage 41 (see FIG. 5). The wirelessly chargeable energy source 4 shown in FIG. 3 and FIG. 4 is now complete.

Returning now to FIG. 2 and FIG. 3 again, for charging the electrical energy storage 41 of the wirelessly chargeable energy source 4, the wirelessly chargeable energy source 4 is arranged such that the longitudinal axis 42 of the receiver coil which coincides with the tubular sleeve longitudinal axis 443 is arranged such that it extends in a plane parallel to the planar flat transmitter coil 30 of charging device 3 of the wireless charging system 1. In addition, wirelessly chargeable energy source 4 is arranged such that the first tubular sleeve end portion 440 and the first receiver coil portion 400 arranged thereon are arranged above a first transmitter coil portion 300 of the planar flat transmitter coil 30, while the second tubular sleeve end portion 441 and the second receiver coil portion 401 (having the opposite winding direction) are arranged above a second transmitter coil portion 301 of the planar flat transmitter coil 30. Also, the longitudinal axis 42 of the receiver coil 40 comprising the first and second receiver coil portions 400, 401 extends in a radial direction of the planar flat transmitter coil 30.

The first transmitter coil portion 300 has a width 60 and the second transmitter coil portion 301 has a width 61 which in the embodiment shown are identical. There is a distance 63 between halfway the width 60 of the first transmitter coil portion 300 and halfway the width 61 of the second transmitter coil portion 301. Also, there is a distance 43 between halfway the length 50 of the first tubular sleeve end portion 440 and halfway the length 51 of the second tubular sleeve end portion 441. Ideally, these distances 43 and 63 are the same.

In addition, the length 50 of the first tubular sleeve end portion 440 is equal to or smaller than the width 60 of the first transmitter coil portion 300. Similarly, the length 51 of the second tubular sleeve end portion 441 is equal to or smaller than the width 61 of the second transmitter coil portion 301.

In case the lengths 50, 51 of the first and second tubular sleeve end portions 440, 441 are equal to the widths 60, 61 of the first and second transmitter coil portions 300, 301, the first and second tubular sleeve end portions 440, 441 are arranged above the first and second transmitter coil portions 300, 301 such that they are completely aligned. Intermediate sleeve 442 has a length 52.

In case the lengths 50, 51 of the first and second tubular sleeve end portions 440, 441 are smaller than the widths 60, 61 of the first and second transmitter coil portions 300, 301, this allows for more tolerance in the positioning of the tubular sleeve end portions above the first and second transmitter coil portions, as the first and second tubular sleeve end portions 440, 441 can then be slightly displaced in the radial direction relative to the first and second transmitter coil portions 300, 301, while the first and second tubular sleeve end portions 440, 441 are still arranged above the respective transmitter coil portions 300, 301 over their entire lengths 50, 51.

When the alternating current I (see FIG. 1) flows through the transmitter coil 30 an alternating magnetic flux is generated essentially in the manner represented by the field lines of the magnetic flux density B shown in FIG. 1. This magnetic flux enters the first and second tubular sleeve end portions 440, 441, and since these are made of a magnetically conductive material the magnetic flux is guided in the first and second tubular sleeve end portions 440, 441. The magnetic flux guided in the first and second tubular sleeve end portions 440, 441 induces alternating currents $I_1$, $I_2$ in the first and second receiver coil portions 400, 401, however, contrary to FIG. 1 the directions of the alternating currents $I_1$, $I_2$ are the same so that they constructively add (due to the opposite winding directions of the first and second receiver coil portions 400, 401) in receiver coil 40. Any magnetic flux is prevented from entering the interior of the three tubular sleeve portions 440, 441, 442 so that the electrical energy storage 41 including the well-known circuitry which is arranged in the interior of these three tubular sleeve portions 440, 441, 442 is not affected by the magnetic flux. At the same time, magnetic flux entering the first tubular sleeve end portion 440 does not interfere with magnetic flux entering the second tubular sleeve end portion 441 and vice versa, since the annular air gaps 444 and 445 constitute a high magnetic resistance relative to the tubular sleeve portions (at least any possible interference, if present at all, is very substantially reduced).

The sum of the alternating currents $I_1$, $I_2$ induced in the first and second receiver coil portions 400, 401 flows towards the electrical energy storage 41, is converted to a DC current by the well-known circuitry (e.g. including a rectifier), and the DC current is then used to charge the battery of the electrical energy storage 41.

Figure 7:
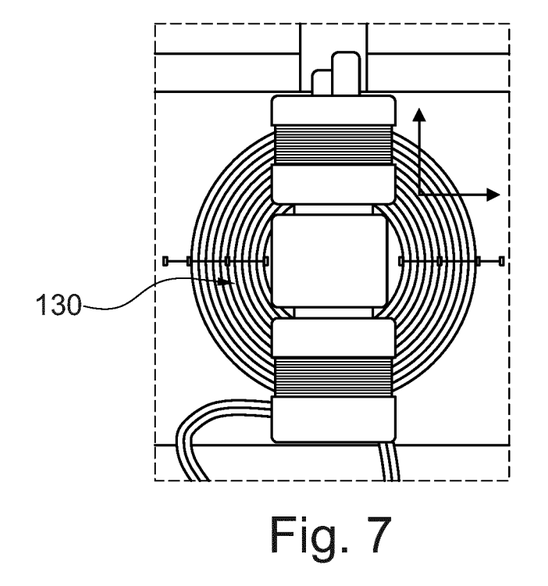
FIG. 7 shows a second embodiment of essential components of a wireless charging system according to the invention, similar to FIG. 2 but with a planar flat transmitter coil having a circular shape.

FIG. 7 shows a second embodiment of essential components of a wireless charging device according to the invention which is similar to the embodiment of FIG. 2. The essential difference when compared with the embodiment of FIG. 2 is, that in the embodiment of FIG. 7 the planar flat transmitter coil 130 has a generally circular shape instead of having the shape of a square as this is the case in the embodiment of FIG. 2. For the rest of this embodiment, it is referred to the description of FIG. 2 to FIG. 6 above.

Figure 8:
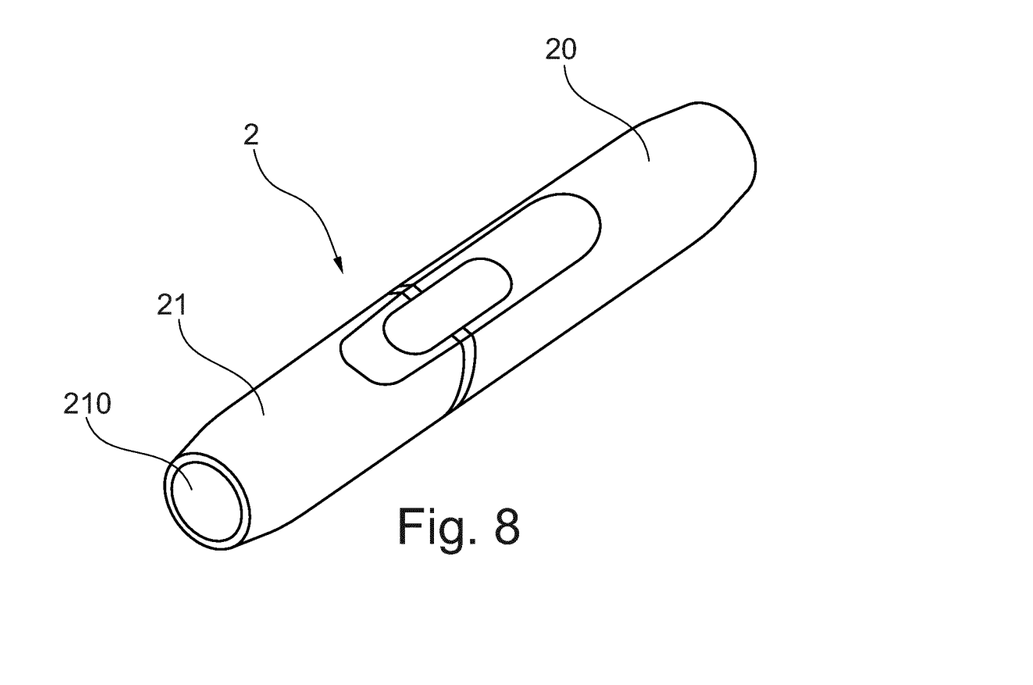
FIG. 8 shows a third embodiment of the wireless charging system according to the invention, which further comprises a heating device for aerosol-generating articles including a tubular housing in which a heater for heating an aerosol-forming substrate is arranged, and in which the wirelessly chargeable energy source is arranged in a waterproof portion of the housing.

FIG. 8 shows a third embodiment of the wireless charging system according to the invention, however, the charging device with the transmitter coil not being shown in FIG. 8. This embodiment of the wireless charging system comprises a heating device 2 for aerosol-generating articles including a tubular housing comprising first and second housing portions 20, 21 in which a heater for heating an aerosol-forming substrate and the wirelessly chargeable energy source 4 (see FIG. 3) are arranged. The wirelessly chargeable energy source 4 is arranged in the first housing portion 20 which may be embodied as a waterproof housing portion. The heater may be arranged in the second housing portion 21 which may also be embodied as a waterproof housing portion.

For example, an aerosol-generating article (not shown) with or without a filter and comprising a cylindrical aerosol-forming substrate (comprising a susceptor) can be inserted into a cavity 210 arranged at the free end of second housing portion 21 in order for the substrate to get inductively heated to form an aerosol that can be drawn in by the user.

In case the heating device 2 is embodied as an inductive heating device comprising a heater coil arranged in the second housing portion 210 in a manner to at least partially surround the cavity 210, it is possible that all components of the device are arranged in the waterproof housing 20, 21 so that the housing can be easily cleaned with water which is very convenient.

The invention claimed is:

1. Wireless charging system for charging a chargeable electrical energy source of a heating device for aerosol-generating articles, the wireless charging system comprising:
   a charging device comprising a planar flat transmitter coil, the charging device being configured to supply an alternating current to the planar flat transmitter coil to generate an alternating magnetic field;
   a wirelessly chargeable electrical energy source of a heating device for aerosol-generating articles, the wirelessly chargeable electrical energy source comprising an electrical energy storage and a tubular receiver coil connected to the electrical energy storage,
   wherein the tubular receiver coil has a longitudinal axis and is arranged in a charging position relative to the planar flat transmitter coil,
   wherein in the charging position the longitudinal axis of the tubular receiver coil extends in a plane parallel to the planar flat transmitter coil as well as in a radial direction of the planar flat transmitter coil,
   wherein in the charging position the tubular receiver coil is arranged to overlap with at least a portion of the planar flat transmitter coil to allow the tubular receiver coil to be penetrated by the alternating magnetic field,
   wherein the tubular receiver coil comprises a first receiver coil portion and a second receiver coil portion which are spaced from one another in the direction of the longitudinal axis of the receiver coil by a predetermined distance, the first receiver coil portion having a first winding direction and the second receiver coil portion having a second winding direction opposite to the first winding direction,
   wherein the tubular receiver coil is wound around a tubular sleeve which is made of at least one layer of a magnetically conductive and electrically non-conductive sheet material, and wherein the electrical energy storage is arranged in the interior of the tubular sleeve,
   wherein the tubular sleeve comprises three separate individual tubular sleeve portions, a first tubular sleeve end portion, a second tubular sleeve end portion, and an intermediate tubular sleeve portion arranged between the first and second tubular sleeve end portions, wherein the first tubular sleeve end portion, the intermediate tubular sleeve portion and the second tubular sleeve end portion are arranged along a tubular sleeve longitudinal axis,
   wherein the first tubular sleeve end portion and the intermediate tubular sleeve portion as well as the intermediate tubular sleeve portion and the second tubular sleeve end portion are spaced from one another by an annular gap, wherein the annular gap has a predetermined width configured to prevent magnetic flux from entering the interior of the tubular sleeve,
   wherein further the first receiver coil portion having the first winding direction is wound around the first tubular sleeve end portion while the second receiver coil portion having the second winding direction opposite to the first winding direction is wound around the second tubular sleeve end portion.

2. Wireless charging system according to claim 1, wherein the predetermined distance by which the first receiver coil portion and the second receiver coil portion are spaced from one another is such that in the charging position the first receiver coil portion overlaps with a first transmitter coil portion in the radial direction while the second receiver coil portion overlaps with a second transmitter coil portion in the radial direction, with the first transmitter coil portion and the second transmitter coil portion being oppositely arranged relative to a center of the planar flat transmitter coil.

3. Wireless charging system according to claim 1, wherein the magnetically conductive and electrically non-conductive sheet material is ferrite.

4. Wireless charging system according to claim 1, wherein each of the first tubular sleeve end portion and the second tubular sleeve end portion comprises two circumferential rings arranged at the ends of the respective first and second tubular sleeve end portion and a recessed portion arranged between the two circumferential rings, and wherein the first receiver coil portion is arranged in the recessed portion of the first tubular sleeve end portion while the second receiver coil portion is arranged in the recessed portion of the second tubular sleeve end portion.

5. Wireless charging system according to claim 1, wherein the length of the first tubular sleeve end portion is equal to or smaller than the width of the first transmitter coil portion, and wherein the length of the second tubular sleeve end portion is equal to or smaller than the width of the second transmitter coil portion.

6. Wireless charging system according to claim 1, comprising a heating device for aerosol-generating articles including a tubular housing in which a heater for heating an aerosol-forming substrate as well as the wirelessly chargeable electrical energy source comprising the tubular receiver coil are arranged, with the wirelessly chargeable electrical energy source being arranged in a waterproof portion of the tubular housing of the heating device.

7. Method for the wireless charging of a chargeable electrical energy source of a heating device for aerosol-generating articles, the method comprising
   providing a charging device comprising a planar flat transmitter coil, the charging device being configured to supply an alternating current to the planar flat transmitter coil to generate an alternating magnetic field;
   providing a wirelessly chargeable electrical energy source of a heating device for aerosol-generating articles, the wirelessly chargeable electrical energy source comprising an electrical energy storage and a tubular receiver coil connected to the electrical energy storage, wherein the tubular receiver coil has a longitudinal axis,
   arranging the wirelessly chargeable electrical energy source in a charging position relative to the planar flat transmitter coil,
   wherein in the charging position the longitudinal axis of the tubular receiver coil extends in a plane parallel to the planar flat transmitter coil as well as in a radial direction of the planar flat transmitter coil, and
   wherein further in the charging position the tubular receiver coil is arranged to overlap with at least a portion of the planar flat transmitter coil to allow the tubular receiver coil to be penetrated by the alternating magnetic field,
   supplying an alternating current to the planar flat transmitter coil, thereby generating an alternating magnetic field penetrating through the tubular receiver coil and inducing an alternating charging current in the tubular receiver coil, and charging the chargeable energy source using the alternating charging current induced in the tubular receiver coil, wherein the step of providing a wirelessly chargeable electrical energy source comprises providing an electrical energy source having a tubular receiver coil that comprises a first receiver coil portion and a second receiver coil portion which are spaced from one another in the direction of the longitudinal axis of the receiver coil by a predetermined distance, the first receiver coil portion having a first winding direction and the second receiver coil portion having a second winding direction opposite to the first winding direction, wherein the step of providing a wirelessly chargeable electrical energy source comprises providing a wirelessly chargeable electrical energy source in which the receiver coil is wound around a tubular sleeve made of at least one layer of a magnetically conductive and electrically non-conductive sheet material, with the chargeable electrical energy source being arranged in the interior of the tubular sleeve, wherein the step of providing a wirelessly chargeable electrical energy source further comprises providing a wirelessly chargeable electrical energy source in which the tubular sleeve comprises three separate individual tubular sleeve portions, a first tubular sleeve end portion, a second tubular sleeve end portion, and an intermediate tubular sleeve portion arranged between the first and second tubular sleeve end portions, wherein the first tubular sleeve end portion, the intermediate tubular sleeve portion and the second tubular sleeve end portion are arranged along a tubular sleeve longitudinal axis, and wherein the first tubular sleeve end portion and the intermediate tubular sleeve portion as well as the intermediate tubular sleeve portion and the second tubular sleeve end portion are spaced from one another by an annular gap, wherein the annular gap has a predetermined width configured to prevent magnetic flux from entering the interior of the tubular sleeve, and wherein further the first receiver coil portion having the first winding direction is wound around the first tubular sleeve end portion while the second receiver coil portion having the second winding direction opposite to the first winding direction is wound around the second tubular sleeve end portion.

8. Method according to claim 7,
wherein the step of arranging the tubular receiver coil in the charging position comprises
arranging the first receiver coil portion to overlap with a first transmitter coil portion in the radial direction, and
arranging the second receiver coil portion to overlap a with a second transmitter coil portion in the radial direction,
with the first transmitter coil portion and the second transmitter coil portion being oppositely arranged relative to a center of the planar flat transmitter coil.

9. Method according to claim 7, wherein the step of providing a wirelessly chargeable electrical energy source comprises providing a wirelessly chargeable electrical energy source in which each of the first tubular sleeve end portion and the second tubular sleeve end portion comprises two circumferential rings arranged at the ends of the respective first and second tubular sleeve end portion and a recessed portion arranged between the two circumferential rings, and wherein the first receiver coil portion is arranged in the recessed portion of the first tubular sleeve end portion while the second receiver coil portion is arranged in the recessed portion of the second tubular sleeve end portion.

10. Wirelessly chargeable heating device for aerosol-generating articles comprising:
a tubular housing comprising a cavity for accommodating an aerosol-forming substrate,
a heater arranged in the tubular housing, the heater being configured to heat an aerosol-forming substrate to be accommodated in the cavity,
a wirelessly chargeable electrical energy source for supplying electrical energy to the heater, wherein the wirelessly chargeable electrical energy source is arranged in the tubular housing and comprises an electrical energy storage and a tubular receiver coil connected to the electrical energy storage, the tubular receiver coil having a longitudinal axis and is arranged in a charging position relative to a planar flat transmitter coil of a charging device such that in the charging position the longitudinal axis of the tubular receiver coil extends in a plane parallel to the planar flat transmitter coil as well as in a radial direction relative to the planar flat transmitter coil and that the tubular receiver coil overlaps with at least a portion of the planar flat transmitter coil,
wherein the tubular receiver coil comprises a first receiver coil portion and a second receiver coil portion which are spaced from one another in the direction of the longitudinal axis of the receiver coil by a predetermined distance, the first receiver coil portion having a first winding direction and the second receiver coil portion having a second winding direction opposite to the first winding direction;
wherein the tubular receiver coil is wound around a tubular sleeve and is made of at least one layer of a magnetically conductive and electrically non-conductive sheet material, and wherein the chargeable electrical energy source is arranged in the interior of the tubular sleeve,
wherein the tubular sleeve comprises three separate individual tubular sleeve portions, a first tubular sleeve end portion a second tubular sleeve end portion, and an intermediate tubular sleeve portion arranged between the first and second tubular sleeve end portions, wherein the first tubular sleeve end portion, the intermediate tubular sleeve portion and the second tubular sleeve end portion are arranged along a tubular sleeve longitudinal axis,
wherein the first tubular sleeve end portion and the intermediate tubular sleeve portion as well as the intermediate tubular sleeve portion and the second tubular sleeve end portion are spaced from one another by an annular gap, wherein the annular gap has a predetermined width configured to prevent magnetic flux from entering the interior of the tubular sleeve,
wherein further the first receiver coil portion having the first winding direction is wound around the first tubular sleeve end portion while the second receiver coil portion having the second winding direction opposite to the first winding direction is wound around the second tubular sleeve end portion.

11. Wirelessly chargeable heating device according to claim 10, wherein the tubular housing comprises a waterproof portion in which the wirelessly chargeable electrical energy source is arranged.

12. Wirelessly chargeable heating device according to claim 10, wherein the magnetically conductive and electrically non-conductive sheet material is ferrite.

13. Wirelessly chargeable heating device according to claim 10, wherein each of the first tubular sleeve end portion and the second tubular sleeve end portion comprises two circumferential rings arranged at the ends of the respective first and second tubular sleeve end portion and a recessed portion arranged between the two circumferential rings, and wherein the first receiver coil portion is arranged in the recessed portion of the first tubular sleeve end portion while the second receiver coil portion is arranged in the recessed portion of the second tubular sleeve end portion.

* * * * *

UNITED STATES PATENT AND TRADEMARK OFFICE
CERTIFICATE OF CORRECTION

PATENT NO. : 11,522,388 B2
APPLICATION NO. : 16/327907
DATED : December 6, 2022
INVENTOR(S) : Dani et al.

It is certified that error appears in the above-identified patent and that said Letters Patent is hereby corrected as shown below:

On the Title Page

Item (54) and in the Specification, Column 1, Lines 1-4, 'WIRELESS CHARGING SYSTEM FOR CHARGING A CHARGEABLE ELECTRICAL ENERGY COURSE OF A HEATING DEVICE FOR AEROSOL-GENERATING ARTICLES' should read - WIRELESS CHARGING SYSTEM FOR CHARGING A CHARGEABLE ELECTRICAL ENERGY SOURCE OF A HEATING DEVICE FOR AEROSOL-GENERATING ARTICLES -

Signed and Sealed this
Thirty-first Day of January, 2023

Katherine Kelly Vidal
*Director of the United States Patent and Trademark Office*